(12) United States Patent
Zhang et al.

(10) Patent No.: US 12,104,708 B2
(45) Date of Patent: Oct. 1, 2024

(54) GUIDE FRAME FOR FOUR-WAY REVERSING VALVE

(71) Applicant: ZHEJIANG DUNAN ARTIFICIAL ENVIRONMENT CO., LTD., Shaoxing (CN)

(72) Inventors: Fei Zhang, Shaoxing (CN); Qijie Xuan, Shaoxing (CN); Junjie Sun, Shaoxing (CN)

(73) Assignee: ZHEJIANG DUNAN ARTIFICIAL ENVIRONMENT CO., LTD., Shaoxing (CN)

( * ) Notice: Subject to any disclaimer, the term of this patent is extended or adjusted under 35 U.S.C. 154(b) by 0 days.

(21) Appl. No.: 18/123,923

(22) Filed: Mar. 20, 2023

(65) Prior Publication Data
US 2023/0228334 A1    Jul. 20, 2023

Related U.S. Application Data

(63) Continuation of application No. PCT/CN2021/111801, filed on Aug. 10, 2021.

(30) Foreign Application Priority Data

Sep. 25, 2020 (CN) .......................... 202022129979.6
Sep. 25, 2020 (CN) .......................... 202022141777.3

(51) Int. Cl.
*F16K 3/316* (2006.01)
*F16K 3/26* (2006.01)
(Continued)

(52) U.S. Cl.
CPC .............. *F16K 3/316* (2013.01); *F16K 3/262* (2013.01); *F16K 11/0655* (2013.01);
(Continued)

(58) Field of Classification Search
CPC ...... F16K 3/316; F16K 3/262; F16K 11/0655; F16K 11/0708; F16K 27/105;
(Continued)

(56) References Cited

U.S. PATENT DOCUMENTS 3,894,561 A * 7/1975 Thornbery .............. F25B 41/26
                                                      137/625.29
4,524,950 A    6/1985 Vitas et al.
(Continued)

FOREIGN PATENT DOCUMENTS

CN    101319734 A * 12/2008
CN    201982785 U * 9/2011
(Continued)

OTHER PUBLICATIONS

International Search Report of PCT/CN2021/111801.
China Office Action of 202022141777.3.

*Primary Examiner* — John Bastianelli

(57) ABSTRACT

A guide frame for a four-way reversing valve includes a frame body. Both ends of the frame body include a connecting portion, respectively. The connecting portion includes a first bending member and a second bending member, and the directions of bending of the first bending member and of the second bending member are opposite. The connecting portion includes a reinforcing member. The reinforcing member includes a first reinforcing plate and a second reinforcing plate. The first reinforcing plate is connected to the inner side of the first bending member by welding and the second reinforcing plate is connected to the inner side of the second bending member by welding. The connection strength of the connecting portion is increased, such that the guide frame is less likely to deform or break.

18 Claims, 4 Drawing Sheets

(51) Int. Cl.
   *F16K 11/065*     (2006.01)
   *F16K 11/07*      (2006.01)
   *F16K 27/10*      (2006.01)
   *F16K 51/00*      (2006.01)
   *F25B 41/20*      (2021.01)

(52) U.S. Cl.
   CPC ........ *F16K 11/0708* (2013.01); *F16K 27/105* (2013.01); *F16K 51/00* (2013.01); *F25B 41/20* (2021.01); *Y10T 137/86839* (2015.04)

(58) Field of Classification Search
   CPC .......... F16K 51/00; F25B 41/20; F25B 41/26; Y10T 137/86839
   USPC ..................................................... 137/625.43
   See application file for complete search history.

(56) References Cited

U.S. PATENT DOCUMENTS

| | | | |
|---|---|---|---|
| 10,619,897 B2* | 4/2020 | Huang | .................... F16K 11/07 |
| 2005/0242318 A1 | 11/2005 | Maxwell et al. | |
| 2018/0299173 A1* | 10/2018 | Huang | .................... F25B 41/26 |

FOREIGN PATENT DOCUMENTS

| CN | 202007922 U | * | 10/2011 |
|---|---|---|---|
| CN | 102678956 A | * | 9/2012 |
| CN | 102758958 A | * | 10/2012 |
| CN | 202812306 U | | 3/2013 |
| CN | 105090556 A | | 11/2015 |
| CN | 208967098 U | | 6/2019 |
| CN | 213685535 U | | 7/2021 |

\* cited by examiner

GUIDE FRAME FOR FOUR-WAY REVERSING VALVE

CROSS-REFERENCE TO RELATED APPLICATIONS

This application is a continuation of international patent application No. PCT/CN2021/111801, filed on Aug. 10, 2021, which itself claims priority to Chinese patent application No. 202022129979.6, filed on Sep. 25, 2020, and titled, "GUIDE FRAME FOR FOUR-WAY REVERSING VALVE", and Chinese patent application No. 202022141777.3, filed on Sep. 25, 2020, and titled, "GUIDE FRAME FOR FOUR-WAY REVERSING VALVE". The contents of the above identified applications are hereby incorporated herein in their entireties by reference.

TECHNICAL FIELD

The present disclosure relates to the field of air conditioning technology, especially relates to a guide frame for a four-way reversing valve.

BACKGROUND

A four-way reversing valve is an essential part of a variable temperature system of an air conditioner, and a working principle of which is described herein. When a solenoid valve is in the power-off state, a pilot valve moves to the left under the action of a compression spring on the right side, a high pressure gas enters the capillary tube and then enters a piston cavity at the right end; on the other hand, a gas in a piston cavity at the left end discharges, due to the pressure difference between the two ends of the piston, the piston moves left, while the guide frame connected with the piston drives the sliding block to move left together, so that an exhaust pipe is connected to the outdoor unit receiver, and the other two receiver connected to form the refrigeration cycle. When the solenoid valve is energized, the pilot valve overcomes the spring force under the magnetic force of the solenoid coil to move to the right, and the high pressure gas enters the piston cavity at the left end via the capillary tube. On the other hand, the gas in the piston chamber at the right end is discharged and the piston moves right under the action of the pressure difference between the two ends of the piston, while the guide frame connected with the piston drives the sliding block to move right together, and the exhaust pipe is connected with the indoor unit receiver to form the heating cycle.

It could be concluded from above that the guide frame plays an important role in the process of switching between cooling and heating modes of the air conditioning system. Currently, the conventional guide frame includes a frame body with a sliding block groove and a flow channel hole. Both ends of the guide frame have a bending part connected with a piston assembly. With the increase of fluid pressure and use of time, both ends of the guide frame bending part is prone to deformation, or even fracture, resulting in that the four-way reversing valve cannot be normal reversing work, and then lead to switching failure of the cooling mode and the heating mode of the air conditioning system.

SUMMARY

In view of above, it is necessary to provide a guide frame for a four-way reversing valve. By providing the reinforcing member, connecting strength between the guide frame and a piston assembly can be improved, making the guide frame not easily to deform or crack, so that the four-way reversing valve applying the guide frame have a broader application prospect.

The present disclosure provides a guide frame for a four-way reversing valve, which includes a plate-shaped frame body configured for disposing a sliding block assembly of the four-way reversing valve. Both ends of the frame body are provided with a connecting portion configured for connecting a piston assembly of the four-way reversing valve, respectively. The connecting portion includes a first bending member and a second bending member, and directions of bending of the first bending member and of the second bending member are opposite and located in a plane perpendicular to the frame body. The connecting portion is provided with a reinforcing member including a first reinforcing plate and a second reinforcing plate disposed separately. The first reinforcing plate is connected to an outer side of the first bending member by welding, and the second reinforcing plate is connected to an outer side of the second bending member by welding. The first reinforcing plate is connected to a bending part of an inner side of the first bending member by welding, and at least three welding spots are defined between the first reinforcing plate and the first bending member. The second reinforcing plate is connected to a bending part of an inner side of the second bending member by welding, and at least three welding spots are defined between the second reinforcing plate and the second bending member.

In this way, by providing the reinforcing member, connecting strength between the guide frame and a piston assembly can be improved, making the guide frame not easily to deform or crack, and improving a service life and a working strength of the guide frame.

In order to make a reinforcing plate fit with a bending plate, and improving an efficiency of the bending plate, the first reinforcing plate and the second reinforcing plate are in a bent structure. The first reinforcing plate includes a first bending plate and a second bending plate, and the second reinforcing plate includes a third bending plate and a fourth bending plate. When the first reinforcing plate is connected to the outer side of the first bending member by welding, and the second reinforcing plate is connected to the outer side of the second bending member by welding, the first bending plate fits with the first bending member, the second bending plate fits with the frame body, the third bending plate fits with the second bending member, and the fourth bending plate fits with the frame body. Optionally, when the first reinforcing plate is connected to the inner side of the first bending member by welding, and the second reinforcing plate is connected to the inner side of the second bending member by welding, the first bending plate fits with the first bending member, the second bending plate fits with the frame body of the guide frame, the third bending plate fits with the second bending member, and the fourth bending plate fits with the frame body of the guide frame.

In this way, by bending the reinforcing plate and the bending member to a preset degree, the reinforcing plate can fit with the bending member, and compactness between the reinforcing plate and the bending member can be improved.

In order to fix the bending member with the piston assembly, a middle part of the first bending member is provided with a first connecting hole, a middle part of the second bending member is provided with a second connecting hole, and the piston assembly is connected to the first connecting hole and the second connecting hole by screw fastening.

In this way, by providing the first connecting hole in the middle part of the first bending member and providing the second connecting hole in the middle part of the second bending member, the first bending member can be fixed to the second bending member by screw fastening.

In order to allow the first reinforcing plate and the second reinforcing plate to fix with the piston assembly at the same time, a first mounting hole is provided at a position on the first reinforcing plate corresponding to the first connecting hole of the first bending member, the first mounting hole is provided with a first internal thread, and the first internal thread of the first mounting hole is in accordance with a threaded hole of the first connecting hole; and a second mounting hole is provided at a position on the second reinforcing plate corresponding to the second connecting hole of the second bending member, the second mounting hole is provided with a second internal thread, and the second internal thread of the second mounting hole is in accordance with a threaded hole of the second connecting hole.

In this way, the first reinforcing plate and the second reinforcing plate are fixed with the piston assembly by providing the internal thread.

In order to fix the reinforcing plate with the bending member, when the first reinforcing plate is fixed to the outer side of the first bending member by welding, and the second reinforcing plate is fixed to the outer side of the second bending member by welding, the first reinforcing plate is fixed to the first bending member by laser welding or argon arc welding, and the second reinforcing plate is fixed to the second bending member by laser welding or argon arc welding. When the first reinforcing plate is fixed to the inner side of the first bending member by welding, and the second reinforcing plate is fixed to the inner side of the second bending member by welding, the first reinforcing plate is fixed to the first bending member by electric resistance welding, and the second reinforcing plate is fixed to the second bending member by electric resistance welding.

In this way, by fixing the reinforcing plate with the bending member by laser welding, argon arc welding or electric resistance welding, the reinforcing plate is fixed to the bending member, thereby improving a bending strength of the bending member.

In order to make the first reinforcing plate fix firmly with the second reinforcing plate, when the first reinforcing plate is fixed to the inner side of the first bending member by welding, and the second reinforcing plate is fixed to the inner side of the second bending member by welding, one welding spot is defined between the first bending plate and the first bending member, and at least two welding spots are defined between the second bending plate and the frame body of the guide frame; one welding spot is defined between the third plate and the second member, and at least two welding spots are defined between the fourth bending plate and the frame body of the guide frame.

In this way, by providing a plurality of welding spots, the reinforcing plate is firmly and tightly connected to the bending member.

Furthermore, a thickness of the reinforcing member is in a range of 1 millimeter to 3.5 millimeters.

Furthermore, a sliding block groove and a through hole are disposed at a middle part of the frame body, and the through hole is located near the sliding block groove.

Furthermore, abutting members are correspondingly disposed at both sides of the frame body.

The present disclosure further provides a four-way reversing valve, which includes a valve body, a piston assembly, a sliding block assembly and a guide frame. The sliding block assembly and the guide frame are disposed inside the valve body. The guide frame is configured for mounting the sliding block assembly and guiding the sliding block assembly to move along the guide frame. The guide frame is the guide frame for the four-way reversing valve described above.

The present disclosure provides a guide frame for a four-way reversing valve. By providing the reinforcing member, connecting strength between the guide frame and a piston assembly can be improved, making the guide frame not easily to deform or crack, so that the four-way reversing valve applying the guide frame have a broader application prospect.

Figure 1:
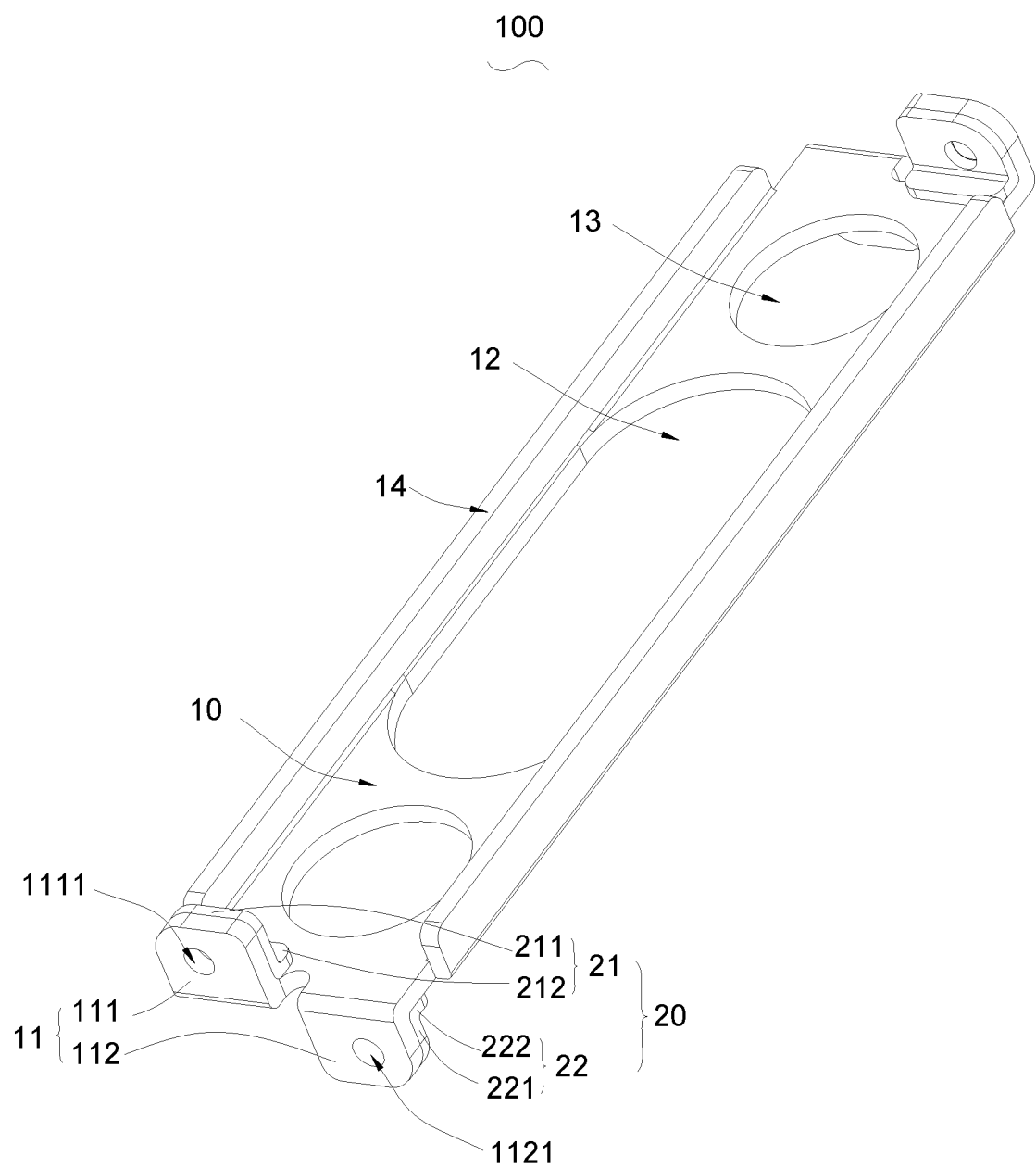
FIG. 1 is a structural schematic diagram of a reinforcing member disposed at an inner side of a frame body of a guide frame in the present disclosure.

100 represents a guide frame; 10 represents a frame body; 11 represents a connecting portion; 111 represents a first bending member; 1111 represents a first connecting hole; 112 represents a second bending member; 1121 represents a second connecting hole; 12 represents a sliding block groove; 13 represents a through hole; 14 represents a abutting member; 20 represents a reinforcing member; 21 represents a first reinforcing plate; 211 represents a first bending plate; 2111 represents a first mounting hole; 2112 represents a first internal thread; 212 represents a second bending plate; 213 represents a welding locating hole; 22 represents a second reinforcing plate; 221 represents a third bending plate; 2211 represents a second mounting hole; 2212 represents a second internal thread; 222 represents a fourth bending plate; 300 represents a four-way reversing valve; 31 represents a valve body; 32 represents a piston assembly, and 33 represents a sliding block assembly.

DETAILED DESCRIPTION

The technical solutions in the embodiments of the present disclosure will be described clearly and completely below in conjunction with the accompanying drawings in the embodiments of the present disclosure. Obviously, the described embodiments are only a part of the embodiments of the present disclosure, and not all of them. Based on the embodiments in the present disclosure, all other embodiments obtained by the skilled in the art without making creative labor fall within the scope of protection of the present disclosure.

It should be noted that when a component is said to be "disposed" on another component, it may be disposed directly on the other component or there may be a centered component. When a component is considered to be "mounted" on another component, it may be directly mounted on the other component or a centered component may also be present. When a component is considered to be "fixed" to another component, it may be fixed directly to the other component or there may be both centered components.

Unless otherwise defined, all technical and scientific terms used herein have the same meaning as commonly understood by the skilled in the art belonging to the present disclosure. The terms used herein in the specification of the present disclosure are for the purpose of describing specific embodiments only and are not intended to limit the present disclosure. The term "or/and" as used herein includes any and all combinations of one or more of the relevant listed items.

A four-way reversing valve is generally used in a variable temperature system of an air conditioner. When a solenoid valve is in the power-off state, a pilot valve moves to the left under the action of a compression spring on the right side, a high pressure gas enters the capillary tube and then enters a piston cavity at the right end; on the other hand, a gas in a piston cavity at the left end discharges, due to the pressure difference between the two ends of the piston, the piston moves left, while the guide frame connected with the piston drives the sliding block to move left together, so that an exhaust pipe is connected to the outdoor unit receiver, and the other two receiver connected to form the refrigeration cycle. When the solenoid valve is energized, the pilot valve overcomes the spring force under the magnetic force of the solenoid coil to move to the right, and the high pressure gas enters the piston cavity at the left end via the capillary tube. On the other hand, the gas in the piston chamber at the right end is discharged and the piston moves right under the action of the pressure difference between the two ends of the piston, while the guide frame connected with the piston drives the sliding block to move right together, and the exhaust pipe is connected with the indoor unit receiver to form the heating cycle. In addition, both ends of the guide frame have a bending part connected with a piston assembly. With the increase of fluid pressure and use of time, both ends of the guide frame bending part is prone to deformation, or even fracture, resulting in that the four-way reversing valve cannot be normal reversing work, and then lead to switching failure of the cooling mode and the heating mode of the air conditioning system.

In order to solve the problems above, the present disclosure provides a guide frame for a four-way valve. By providing a reinforcing member on connecting portions at both ends of the guide frame, a connecting strength of the connecting portion can be improved, so that the guide frame will not easy to deform or crack, thereby improving a service life of the four-way valve.

The present disclosure provides a guide frame 100 for a four-way reversing valve. The guide frame 100 is disposed inside the four-way reversing valve in use. Both ends of the guide frame 100 are connected to a piston assembly in the four-way reversing valve, and a sliding block in the four-way reversing valve is fixed on the guide frame 100.

When the piston assembly is stressed, the guide frame 100 is driven by the piston assembly to make a linear reciprocating motion, and drive the sliding block to move accordingly. Movement of the sliding block can change connecting relationships between each pipe of the four-way reversing valve, and change a flow direction of a refrigerant.

In the present embodiment, the guide frame 100 includes a frame body 10 of the guide frame 100. Both ends of the frame body 10 are connected to the piston assembly, and are configured to fix the piston assembly and load the sliding block assembly.

Specifically, in the present embodiment, the frame body 10 can be approximately square-shaped. The frame body 10 can be provided with a plurality of through holes 13 and a sliding block groove 12. The sliding block groove 12 can be located in a middle part of the frame body 10, and the plurality of through holes 13 are disposed surround the sliding block groove 12. The plurality of through hole 13 are configured for flowing through of a fluid, and the sliding block groove 12 are configured for loading the sliding block assembly and guiding a moving direction of the sliding block.

It could be understood that a relative position between the plurality of through holes 13 and the sliding block groove 12 is not limited in the present disclosure. In some embodiments, the plurality of through holes 13 can be disposed at both sides of the sliding block groove 12, as long as the guide frame can allow the fluid to flow through.

In some embodiments, abutting members 14 can be correspondingly disposed at both sides of the frame body 10, and configured for abutting against a sliding assembly.

Specifically, the abutting members 14 can be disposed at two side surfaces of the frame body 10. The abutting members 14 can be disposed along two side surfaces of the frame body 10. The abutting members 14 can be disposed towards the sliding assembly, and the abutting members 14 can be disposed opposite to each other.

It could be understood that positions of the abutting members 14 is not limited in the present disclosure. In other embodiments, the abutting member 14 can be disposed in the middle of the frame body 10, as long as the sliding assembly is disposed via the abutting member 14.

In the present embodiment, both ends of the frame body 10 can be provided with connecting portions 11, which are configured for fixing the frame body 10 of the guide frame 100 with the piston assembly.

Specifically, the connecting portion 11 can include a first bending member 111 and a second bending member 112. The first bending member 111 and the second bending member 112 can be located at two sides at an end of the frame body 10. Directions of bending of the first bending member 111 and of the second bending member 112 at the same end of the frame body 10 can be opposite. The first bending member 111 can bend towards a side away from the sliding assembly, and the second bending member 112 can bend towards a side near the sliding assembly.

It could be understood that a shape of the bending member is not limited in the present disclosure. In some embodiments, the connecting portion 11 can be Y-shaped, as long as the connecting portion 11 can be fixed with the piston assembly and not easy to bend.

In the present embodiment, a connecting hole is provided in the middle of the bending member, and configured for fixing the frame body 10 of the guide frame 100 with the piston assembly.

Specifically, in the present embodiment, a first connecting hole is provided in a middle part of the first bending member 111, a second connecting hole is provided in a middle part of the second bending member 112. Both the first connecting hole and the second connecting hole are threaded holes. The first bending member 111 and the second bending member 112 can be fixed with the piston assembly by screw fastening, and the first connecting hole and the second connecting hole can be fixed by screw fastening.

It could be understood that a method for connecting the bending member with the piston assembly is not limited in the present disclosure. In some embodiments, the bending member can be fixed with the piston assembly by welding.

In the present embodiment, the guide frame 100 can further include a reinforcing member 20 disposed at two ends of the frame body 10. The reinforcing member 20 can be configured for improving a connecting strength and stability between the frame body 10 and the piston assembly.

Figure 2:
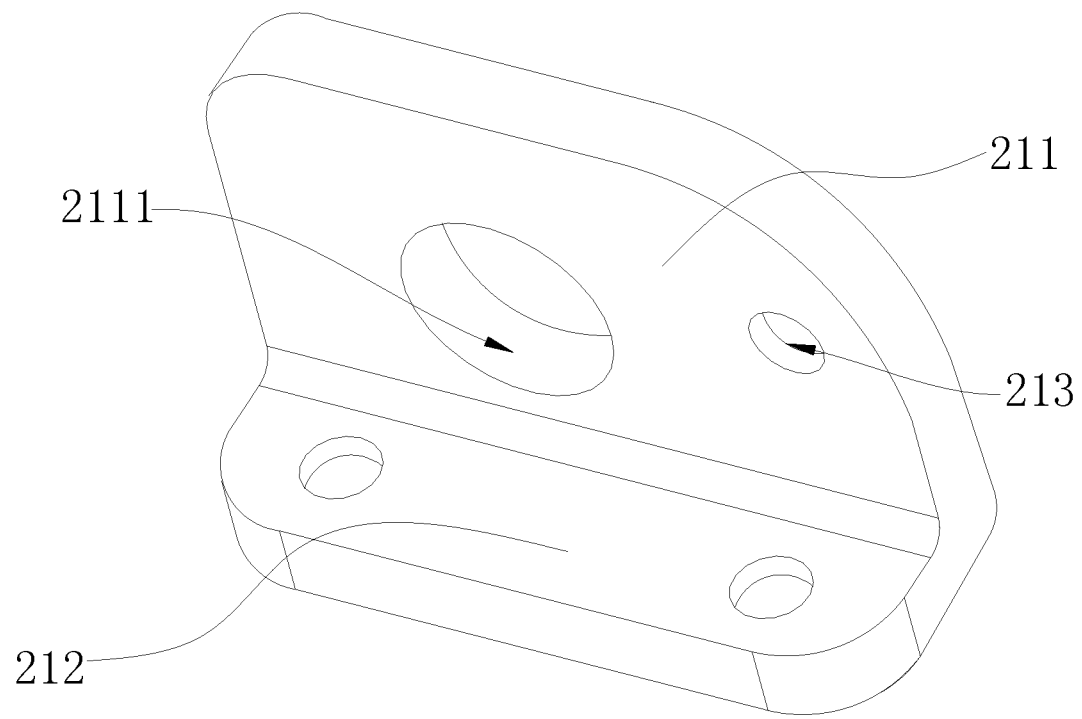
FIG. 2 is a structural schematic diagram of the reinforcing member of the guide frame in FIG. 1.

FIG. 1 is a structural schematic diagram of a reinforcing member in the present disclosure, and FIG. 2 is a structural schematic diagram of the reinforcing member of the guide frame in FIG. 1. The reinforcing member 20 disposed at an end of the guide frame 100 can include a first reinforcing plate 21 and a second reinforcing plate 22 separately disposed. A shape of the first reinforcing plate 21 can be the same as that of the second reinforcing plate 22. The first reinforcing plate 21 and the second reinforcing plate 22 can be bend. The first reinforcing plate 21 can fit with an inner side of the first bending member 111, and the first reinforcing plate 21 can be in surface contact with the first bending member 111. The first reinforcing plate 21 can include a first bending plate 211 and a second bending plate 212. The first bending plate 211 can fit with the first bending member 111, and the second bending plate 212 can fit with the frame body 10 of the guide frame 100. The second reinforcing plate 22 can fit with an inner side of the second bending member 112, and the second reinforcing plate 22 can be in surface contact with the second bending member 112. The second reinforcing plate 22 can include a third bending plate 221 and a fourth bending plate 222. The third bending plate 221 can fit with the second bending member 112, and the fourth bending plate 222 can fit with the frame body of the guide frame 100.

Specifically, the first reinforcing plate 21 can be fixed on the inner side of the first bending member 111 by electric resistance welding. At least three welding spots can be defined between the first reinforcing plate 21 and the first bending member 111, and at least three welding spots can be defined between the second reinforcing plate 22 and the second bending member 112.

In the present embodiment, a welding locating hole 213 can be defined between the first bending plate 211 of the first reinforcing plate 21 and the first bending member 111. The first bending plate 211 can be connected to the first bending member 111 by welding at the welding locating hole 213. Two welding locating holes 213 can be defined between the second bending plate 212 and the frame body of the guide frame 100, and the second bending plate 212 can be connected to the first bending member 111 by welding at the two welding locating holes 213. The second reinforcing plate 22 can be fixed to the inner side of the second bending member 112 by electric resistance welding, and a welding locating hole 213 can be defined between the third bending plate 221 of the second reinforcing plate 22 and the second bending member 112. The third bending plate 221 can be connected to the second bending member 112 by welding at the welding locating hole 213. Two welding locating holes 213 can be defined between the fourth bending plate 222 and the guide frame 100, and the fourth bending plate 222 can be connected to the frame body of the guide frame 100 by welding at the two welding locating holes 213.

It could be understood that the number of the welding locating hole 213 between the first reinforcing plate 21 and the first bending member 111, and the number of the welding locating hole 213 between the second reinforcing plate 22 and the second bending member 112 are not limited in the present disclosure. In some embodiment, four welding locating holes 213 can be located between the first reinforcing plate 21 and the first bending member 111, and four welding locating holes 213 can be located between the second reinforcing plate 22 and the second bending member 112.

Figure 3:
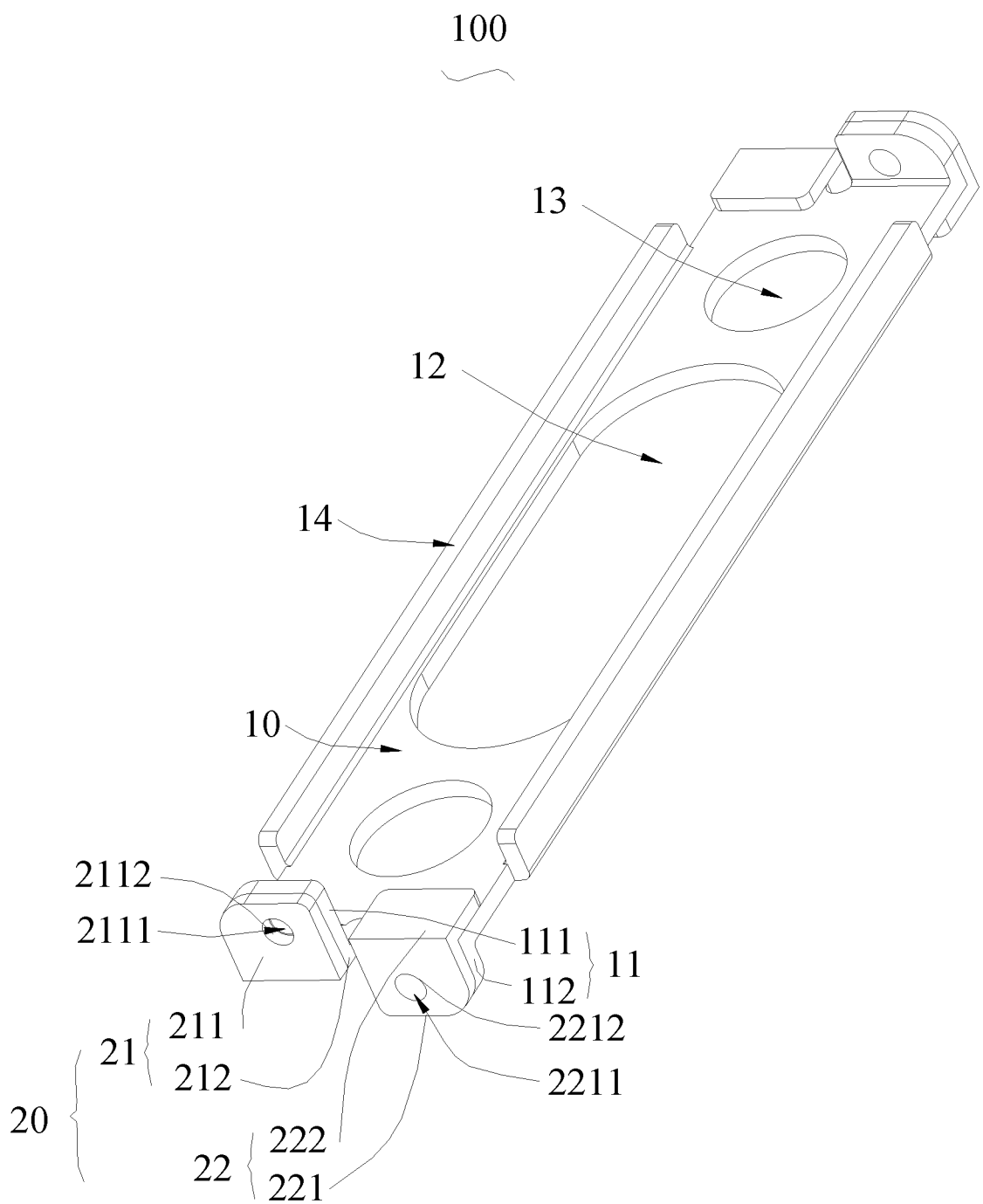
FIG. 3 is a structural schematic diagram of a reinforcing member disposed at an outer side of a frame body of a guide frame in the present disclosure.
Figure 4:
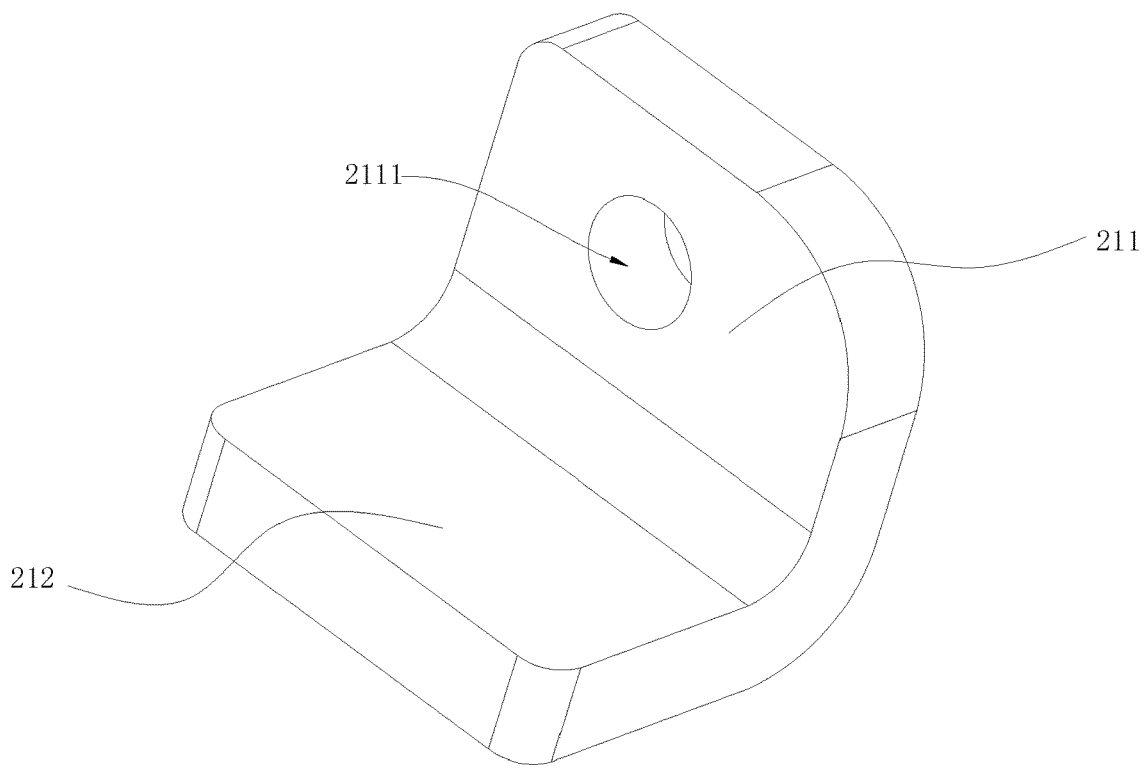
FIG. 4 is a structural schematic diagram of the reinforcing member of the guide frame in FIG. 3.
Figure 5:
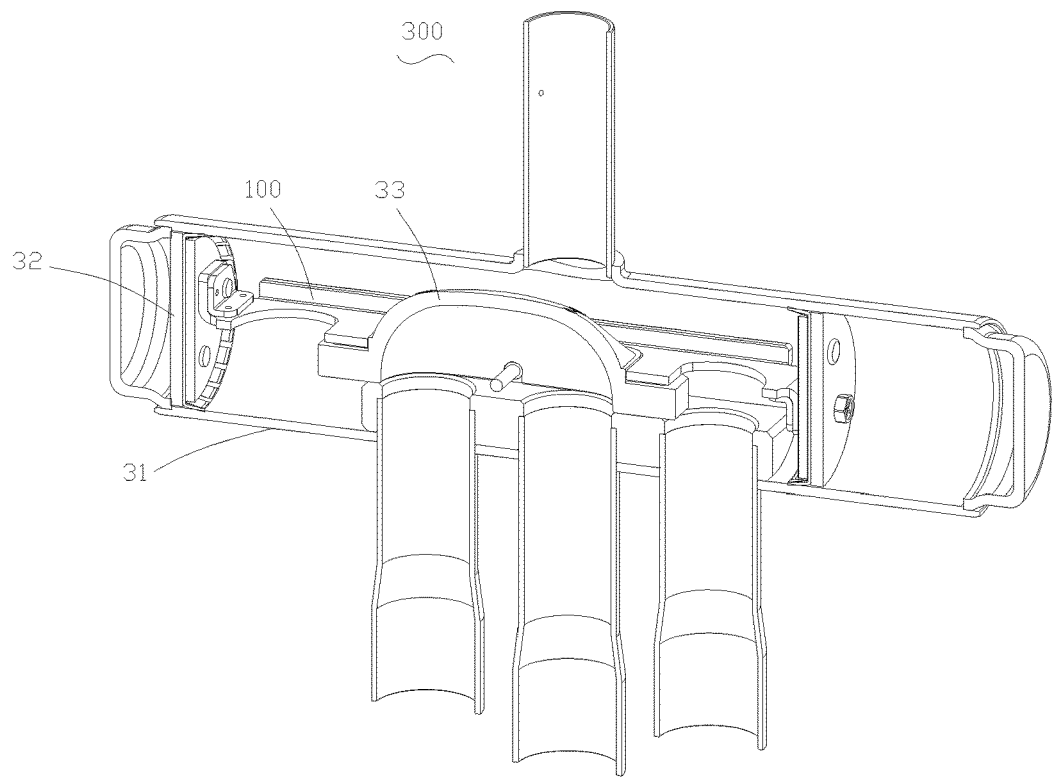
FIG. 5 is a structural schematic diagram of a four-way reversing valve in the present disclosure.

FIG. 3 is a guide frame in another embodiment of the present disclosure, and FIG. 4 is a structural schematic diagram of the reinforcing member of the guide frame in FIG. 3. The reinforcing member 20 disposed at an end of the guide frame 100 can include a first reinforcing plate 21 and a second reinforcing plate 22 separately disposed. A shape of the first reinforcing plate 21 can be the same as that of the second reinforcing plate 22. The first reinforcing plate 21 and the second reinforcing plate 22 can be in a bend structure. The first reinforcing plate 21 can fit with an outer side of the first bending member 111, and the first reinforcing plate 21 can be in surface contact with the first bending member 111. The first reinforcing plate 21 can include a first bending plate 211 and a second bending plate 212. The first bending plate 211 can be perpendicular to the frame body 10 of the guide frame and fit with the first bending member 111, and the second bending plate 212 can be perpendicular to the first bending member 111 and fit with the frame body 10 of the guide frame 100. The second reinforcing plate 22 can fit with an outer side of the second bending member 112, and the second reinforcing plate 22 can be in surface contact with the second bending member 112. The second reinforcing plate 22 can include a third bending plate 221 and a fourth bending plate 222. The third bending plate 221 can be perpendicular to the frame body 10 of the guide frame 100 and fit with the second bending member 112, and the fourth bending plate 222 can be perpendicular to the second bending member 112 and fit with the frame body of the guide frame 100.

Specifically, the first reinforcing plate 21 can be fixed on the outer side of the first bending member 111 by argon arc welding. The second reinforcing plate 22 can be fixed to the outer side of the second bending member 112 by argon arc welding.

In some embodiments, the first reinforcing plate 21 can be fixed to the outer side of the first bending member 111 by, for example, laser welding, and the second reinforcing plate can also be fixed to the outer side of the second bending member 112 by, for example, laser welding.

In the present embodiment, a thickness of the reinforcing member 20 can be in a range of 1 millimeter of 3.5 millimeters. When the thickness of the reinforcing member 20 is unduly thin, the reinforcing member 20 cannot plate the role of strengthening and tightening. At the same time, when the thickness of the reinforcing member 20 is unduly thick, it is hard to process the reinforcing member 20, and it is hard to ensure complete fitting of the angle.

It should be noted that a first mounting hole can be provided at a position on the first reinforcing plate 21 corresponding to the first connecting hole of the first bending member 111, and a second mounting hole can be provided at a position on the second reinforcing plate 22 corresponding to the second connecting hole of the second bending member 112. The first connecting hole and the first mounting hole can be provided with a first internal thread, and the threaded hole of the first connecting hole can be in accordance with the treaded hole of the first mounting hole. The second connecting hole and the second mounting hole can be provided with a second internal thread, and the threaded hole of the second connecting hole can be in accordance with that of the second mounting hole.

In this way, each of the separately disposed first reinforcing plate 21 and the second reinforcing plate 22 can be provided with mounting holes corresponding to the first bending member 111 and the second bending member 112. In the mounting process, the first mounting hole of the first reinforcing plate 21 can be located corresponding to the first connecting hole of the first bending member 11, and the second mounting hole of the second reinforcing plate 22 can be located corresponding to the second connecting hole of the second bending member 112, so that the processing process is simple and convenient.

The present disclosure further provides a four-way reversing valve. The four-way reversing valve includes a structure of the guide frame 100. The guide frame 100 can withstand a high-intensity movement of a sliding block, and the four-way reversing valve can be a large four-way reversing valve.

The technical features of the above-mentioned embodiments can be combined arbitrarily. In order to make the description concise, not all possible combinations of the technical features are described in the embodiments. However, as long as there is no contradiction in the combination of these technical features, the combinations should be considered as in the scope of the present disclosure.

The above-described embodiments are only several implementations of the present disclosure, and the descriptions are relatively specific and detailed, but they should not be construed as limiting the scope of the present disclosure. It should be understood by those of ordinary skill in the art that various modifications and improvements can be made without departing from the concept of the present disclosure, and all fall within the protection scope of the present disclosure. Therefore, the patent protection of the present disclosure shall be defined by the appended claims.

What is claimed is:

1. A guide frame for a four-way reversing valve, comprising a plate-shaped frame body configured for disposing a sliding block assembly of the four-way reversing valve, both ends of the frame body are provided with a connecting portion configured for connecting a piston assembly of the four-way reversing valve, respectively, the connecting portion comprises a first bending member and a second bending member, and directions of bending of the first bending member and of the second bending member are opposite and located in a plane perpendicular to the frame body,
wherein the connecting portion is provided with a reinforcing member comprising a first reinforcing plate and a second reinforcing plate disposed separately,
the first reinforcing plate is connected to a bending part of an inner side of the first bending member by welding, and at least three welding spots are defined between the first reinforcing plate and the first bending member, and the second reinforcing plate is connected to a bending part of an inner side of the second bending member by welding, and at least three welding spots are defined between the second reinforcing plate and the second bending member, and,
a plurality of welding locating holes are defined between the first reinforcing plate and the first bending member and the second reinforcing plate and the second bending member, the first reinforcing plate is connected to the first bending member by welding at the plurality of welding locating holes, and the second reinforcing plate is connected to the second bending member by welding at the plurality of welding locating holes.

2. The guide frame for the four-way reversing valve of claim 1, wherein the first reinforcing plate and the second reinforcing plate are in a bent structure, the first reinforcing plate comprises a first bending plate and a second bending plate, and the second reinforcing plate comprises a third bending plate and a fourth bending plate,
the first bending plate fits with the first bending member, the second bending plate fits with the frame body of the guide frame, the third bending plate fits with the second bending member, and the fourth bending plate fits with the frame body of the guide frame.

3. The guide frame for the four-way reversing valve of claim 1, wherein a middle part of the first bending member is provided with a first connecting hole, a middle part of the second bending member is provided with a second connecting hole, and the piston assembly is connected to the first connecting hole and the second connecting hole by screw fastening.

4. The guide frame for the four-way reversing valve of claim 3, wherein a first mounting hole is provided at a position on the first reinforcing plate corresponding to the first connecting hole of the first bending member, the first mounting hole is provided with a first internal thread, and the first internal thread of the first mounting hole is in accordance with a threaded hole of the first connecting hole; and
a second mounting hole is provided at a position on the second reinforcing plate corresponding to the second connecting hole of the second bending member, the second mounting hole is provided with a second internal thread, and the second internal thread of the second mounting hole is in accordance with a threaded hole of the second connecting hole.

5. The guide frame for the four-way reversing valve of claim 1, wherein
the first reinforcing plate is fixed to the first bending member by electric resistance welding, and the second reinforcing plate is fixed to the second bending member by electric resistance welding.

6. The guide frame for the four-way reversing valve of claim 2, wherein one welding spot is defined between the first bending plate and the first bending member, and at least two welding spots are defined between the second bending plate and the frame body of the guide frame; one welding spot is defined between the third plate and the second member, and at least two welding spots are defined between the fourth bending plate and the frame body of the guide frame.

7. The guide frame for the four-way reversing valve of claim 1, wherein a thickness of the reinforcing member is in a range of 1 millimeter to 3.5 millimeters.

8. The guide frame for the four-way reversing valve of claim 1, wherein a sliding block groove and a through hole are disposed at a middle part of the frame body, and the through hole is located near the sliding block groove.

9. The guide frame for the four-way reversing valve of claim 1, wherein abutting members are correspondingly disposed at both sides of the frame body.

10. A four-way reversing valve, comprising a valve body, a piston assembly, a sliding block assembly and a guide frame, wherein the sliding block assembly and the guide frame are disposed inside the valve body, the guide frame is configured for mounting the sliding block assembly and guiding the sliding block assembly to move along the guide frame,
wherein the guide frame comprises a plate-shaped frame body configured for disposing a sliding block assembly of the four-way reversing valve, both ends of the frame body are provided with a connecting portion configured for connecting a piston assembly of the four-way reversing valve, respectively, the connecting portion comprises a first bending member and a second bending member, and directions of bending of the first bending member and of the second bending member are opposite and located in a plane perpendicular to the frame body, wherein the connecting portion is provided with a reinforcing member comprising a first reinforcing plate and a second reinforcing plate disposed separately, the first reinforcing plate is connected to a bending part of an inner side of the first bending member by welding, and at least three welding spots are defined between the first reinforcing plate and the first bending member, and the second reinforcing plate is connected to a bending part of an inner side of the second bending member by welding, and at least three welding spots are defined between the second reinforcing plate and the second bending member and, a plurality of welding locating holes are defined between the first reinforcing plate and the first bending member and the second reinforcing plate and the second bending member, the first reinforcing plate is connected to the first bending member by welding at the plurality of welding locating holes, and the second reinforcing plate is connected to the second bending member by welding at the plurality of welding locating holes.

11. The four way reversing valve of claim 10, wherein the first reinforcing plate and the second reinforcing plate are in a bent structure, the first reinforcing plate comprises a first bending plate and a second bending plate, and the second reinforcing plate comprises a third bending plate and a fourth bending plate, the first bending plate fits with the first bending member, the second bending plate fits with the frame body of the guide frame, the third bending plate fits with the second bending member, and the fourth bending plate fits with the frame body of the guide frame.

12. The four way reversing valve of claim 10, wherein a middle part of the first bending member is provided with a first connecting hole, a middle part of the second bending member is provided with a second connecting hole, and the piston assembly is connected to the first connecting hole and the second connecting hole by screw fastening.

13. The four way reversing valve of claim 12, wherein a first mounting hole is provided at a position on the first reinforcing plate corresponding to the first connecting hole of the first bending member, the first mounting hole is provided with a first internal thread, and the first internal thread of the first mounting hole is in accordance with a threaded hole of the first connecting hole; and a second mounting hole is provided at a position on the second reinforcing plate corresponding to the second connecting hole of the second bending member, the second mounting hole is provided with a second internal thread, and the second internal thread of the second mounting hole is in accordance with a threaded hole of the second connecting hole.

14. The four way reversing valve of claim 10, wherein the first reinforcing plate is fixed to the first bending member by electric resistance welding, and the second reinforcing plate is fixed to the second bending member by electric resistance welding.

15. The four way reversing valve of claim 11, wherein one welding spot is defined between the first bending plate and the first bending member, and at least two welding spots are defined between the second bending plate and the frame body of the guide frame; one welding spot is defined between the third plate and the second member, and at least two welding spots are defined between the fourth bending plate and the frame body of the guide frame.

16. The four way reversing valve of claim 10, wherein a thickness of the reinforcing member is in a range of 1 millimeter to 3.5 millimeters.

17. The four way reversing valve of claim 10, wherein a sliding block groove and a through hole are disposed at a middle part of the frame body, and the through hole is located near the sliding block groove.

18. The four way reversing valve of claim 10, wherein abutting members are correspondingly disposed at both sides of the frame body.

* * * * *